United States Patent
Buck et al.

(10) Patent No.: US 6,470,694 B1
(45) Date of Patent: Oct. 29, 2002

(54) METHOD AND DEVICE FOR AUTOMATIC DETECTION OF THE EQUIPMENT STATUS OF AN AUTOMOBILE

(75) Inventors: Reiner Buck, Vaihingen; Juergen Stock, Eberdingen; Joachim Wahl, Birkenheide, all of (DE); Ju Ho Lee, Inchoen (KR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/574,805

(22) Filed: May 19, 2000

(30) Foreign Application Priority Data

May 19, 1999 (DE) .......................... 199 22 978

(51) Int. Cl.[7] .............................. F25B 49/02

(52) U.S. Cl. .......................... 62/126; 62/243

(58) Field of Search .................. 62/125, 126, 129, 62/131, 133, 243, 230, 323.1, 323.4

(56) References Cited

U.S. PATENT DOCUMENTS

| | | | | | |
|---|---|---|---|---|---|
| 4,359,875 A | * | 11/1982 | Ohtani | .................. | 62/133 |
| 4,823,555 A | * | 4/1989 | Ohkumo | .................. | 62/243 X |
| 5,117,643 A | * | 6/1992 | Sakurai et al. | .................. | 62/133 |
| 5,507,152 A | * | 4/1996 | Iwata et al. | .................. | 62/131 |

* cited by examiner

Primary Examiner—Harry B. Tanner
(74) Attorney, Agent, or Firm—Kenyon & Kenyon

(57) ABSTRACT

A method and a device for automatic detection of an equipment status of optional power consuming components, such as an air conditioning compressor, for an automobile are described. A signal formed in the automotive controller is monitored as a function of an engine load to determine whether the signal undergoes a certain change, for example, reaches a predetermined range, when an optional power consuming component is turned on, or power is demanded through corresponding switch operation, indicating the presence of the optional power consuming component, with the goal of achieving a permanent change in control data as a function of the automotive equipment present.

12 Claims, 2 Drawing Sheets

METHOD AND DEVICE FOR AUTOMATIC DETECTION OF THE EQUIPMENT STATUS OF AN AUTOMOBILE

FIELD OF THE INVENTION

The present invention relates to a method and device for automatic detection of the equipment status of an automobile.

BACKGROUND INFORMATION

It is conventional for the same model of an automobile to be equipped with a wide range of features. This is true, in particular, of equipment offered as special accessories by an automobile manufacturer, such as a sunroof or air conditioning, to mention only two examples. The greater the power consumption by these optional features in a vehicle, the more it must be taken into account by the controller for the engine, e.g., in the fuel and air metering values in the engine characteristics map.

Conventionally, the data records used for each vehicle are loaded into the controller by the automotive manufacturer in an end-of-line operation.

It has been found that this method is not optimal, in particular with regard to the situation in automotive repair shops (e.g., in retrofitting or disconnecting accessory equipment) and with regard to the idea of reusing or recycling an automotive controller. In retrofitting, the vehicle electric power supply must be disconnected to permit new identification of the vehicle equipment (in particular when removing equipment).

Therefore, an object of the present invention is to provide automatic detection of the equipment status of a vehicle with regard to optional power consuming equipment whose operation must be taken into account by the engine controller.

SUMMARY OF THE INVENTION

With the method according to the present invention the equipment status of a vehicle is automatically detected even during operation of the vehicle and corresponding data records are permanently activated in a controller. As a result, the quality of the engine control is significantly improved (e.g., smooth running) because control measures can be minimized through appropriate precontrol valued.

DETAILED DESCRIPTION

Figure 1A:
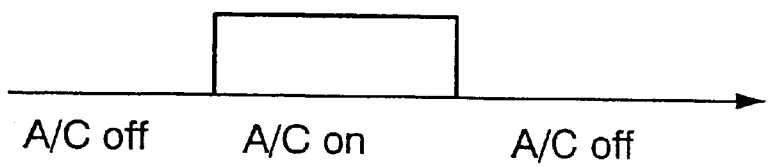
FIG. 1a shows a diagram of an air conditioner being turned on and off.
Figure 1B:
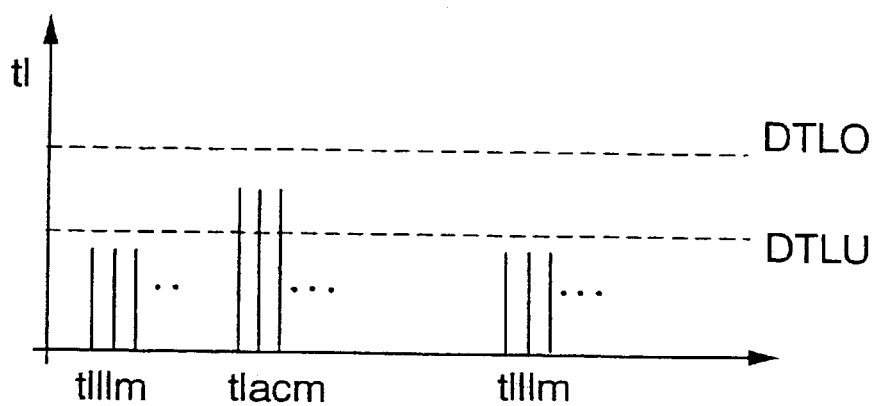
FIG. 1b shows a diagram of load signals occurring in an engine controller as the air conditioner shown in FIG. 1a is turned on and off.

FIG. 1a illustrates the embodiment where the air conditioning switch A/C is switched from the "off" position to the "on" position and then back to the "off" position. In the "on" position, the AC compressor requires power which must be supplied by the engine, so this necessarily results in a change in load signal tl formed in the engine controller. This relationship is illustrated in FIG. 1b, showing a relatively low load signal when the air conditioning system is switched off and an increased load signal as long as it is running.

One basic idea of the present invention is to determine and/or monitor the load value with the air conditioning system turned on and under other given boundary conditions of the engine, or monitor and/or determine the change in the load value as a function of operation of the switch for the air conditioning system. It is especially advantageous if idling of the engine is detected as this boundary condition and if the then prevailing load values are averaged.

Figure 2:
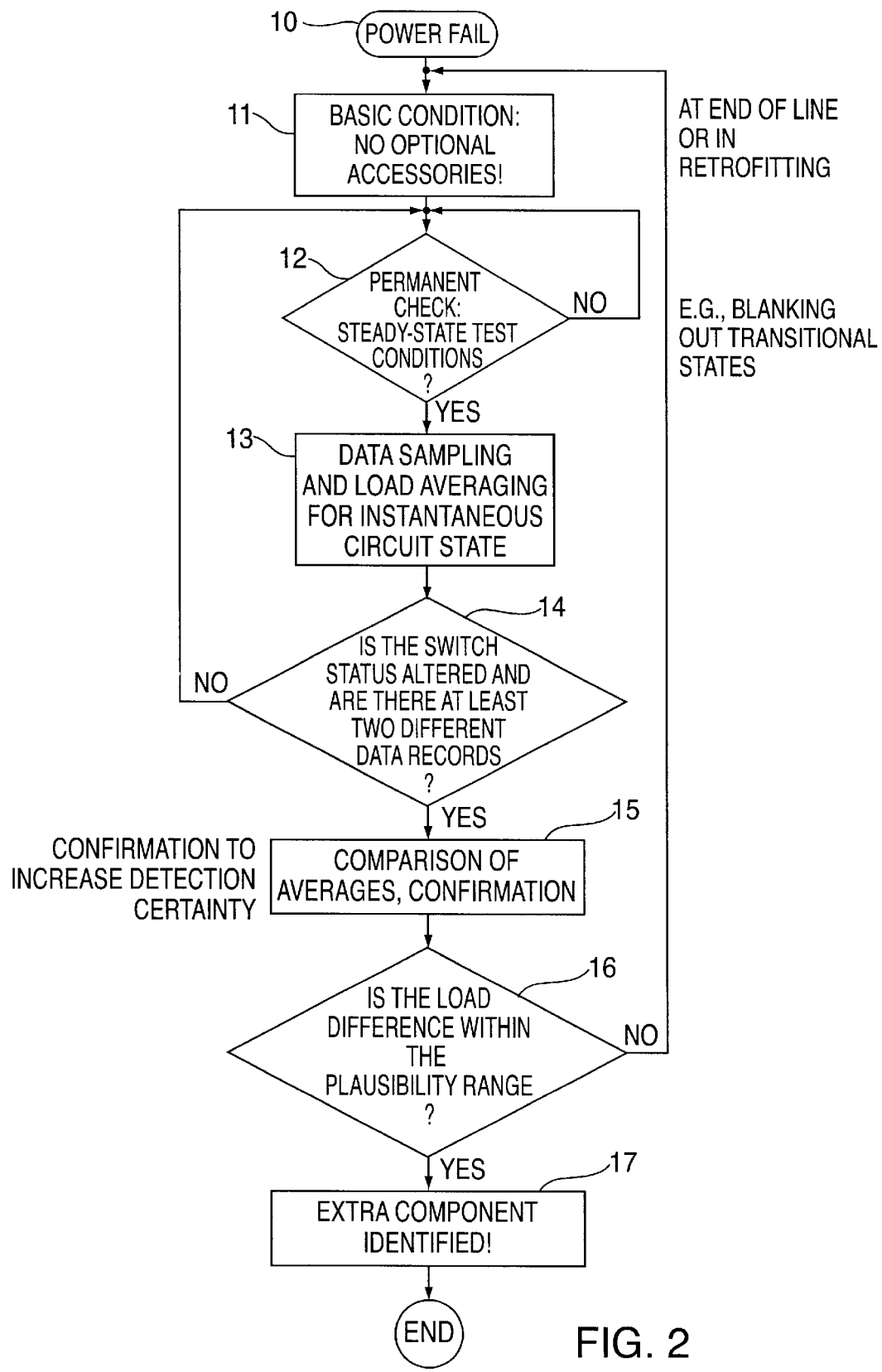
FIG. 2 shows a flow chart for computer-controlled implementation of a method according to the present invention.

FIG. 2 shows a flow chart for computer-controlled implementation of the method of automatic detection of the equipment status of an automobile. In the specific case, this involves detecting whether a vehicle is equipped with an air conditioning system (A/C).

The "power fail" condition or starting or restarting the power supply to the controller is labeled as 10. This condition occurs in fabrication at the end of the line or after retrofitting in a shop. Downstream block 11 characterizes a basic condition in the sense that the controller values are designed for equipment without optional features. Query 12 checks on whether certain test conditions prevail with the goal of blanking out transitional states during normal driving operation. If a test condition is met, data sampling and averaging of the load signals take place in block 13. This yields values trlllm and tlacm shown in FIG. 1b, where tl stands for the load signal, ll stands for idling and m for averaging. Taking FIGS. 1a and 1b into account shows that sampling and averaging of the load values must of course take place in this block 13 even before the air conditioning switch (block 10) is operated so that these values will then be available for comparison purposes. Depending on the case, it may also be regarded as sufficient for sampling to take place at least in the area of a change, in particular before and during or during and after starting of the power consuming component.

Subsequent query 14 determines whether a circuit state has been altered or whether there is a demand for power due to a corresponding operation of a switch (depending on the case, it is also possible here to inquire whether two data records are in fact on hand in the controller). If the answer is yes, a comparison of averages and a confirmation are performed in block 15 with the goal of confirming the result to increase the detection certainty. Finally, interrogation unit 16 performs a plausibility test to determine whether the load difference is within a plausibility range. If this yields a response of "yes" then an additional component is identified and the corresponding data record is switched (block 17). Thus, end 18 of the entire sequence is reached.

Thus, a query is performed with 15 and 16 to determine whether the level of the load signal with the air conditioning equipment status running (tlacm) is in the range between an upper and lower limit value (DTLO and DTLU). An alternative or supplementary embodiment aims at determining whether the change in load signal tl caused by operation of the AC switch reaches a certain value. If the query in 16 is answered as "yes" the vehicle has an air conditioning system, so the engine controller can also switch to other values.

In the case of "no" responses to queries 12 and 14, the program returns to a point directly before query 12, while a "no" response in query 16 returns to the basic condition according to block 11.

It is essential for the starting condition in the design of the engine controller to correspond to absence of an air conditioning system, i.e., the controller must be set for normal vehicle equipment without an air conditioning system. Then, if a certain change in load is detected when the air conditioning system is turned on, there is an increase in the load signal under defined conditions to a certain value, or a certain value range is detected, the fact that the vehicle is equipped with an air conditioning system is recognized and the values in the controller (control data) are permanently altered accordingly.

It is advantageous to always assume the starting condition for a controller when the power supply to the controller has been completely interrupted.

In other words, the basic condition (no optional components present) is assumed each time the power supply is started or restarted, the identification check is activated in certain normal states (idling in particular) and components that have been detected are regarded as identified and present until the next power fail.

As an alternative or in addition, the identification check may be performed according to a load signal gradient and subsequent comparison with upper and/or lower thresholds while the equipment is turned on/off.

It should also be emphasized that the above-mentioned example in conjunction with detection of equipment of a vehicle with an air conditioning system is of course not limited to this embodiment. It can be used in any case where optional power consuming devices are provided in a vehicle requiring a corresponding adjustment of controller functions and data.

What is claimed is:

1. A method of automatic detection of an equipment status of a component of an automobile, comprising the steps of:
   determining an idle load signal as a function of an engine load of the automobile while the component is deactivated;
   determining a component-on load signal as a function of the engine load of the automobile while the component is activated; and
   comparing the idle load signal to the component-on signal, whereby the equipment status of the component is detected if the difference in the signals falls within a predefined plausibility range.

2. The method according to claim 1, wherein the component includes an air conditioning compressor.

3. The method according to claim 1, wherein the component includes an air conditioning system.

4. The method according to claim 1 wherein the idle load signal and the component-on signal are formed by sampling and averaging the engine load.

5. The method according to claim 1 wherein the predefined range forms a band between a predefined upper limit and a predefined lower limit.

6. The method according to claim 1, further comprising the step of changing specific control data in the automotive controller as a function of the detection of the equipment status of the component.

7. The method according to claim 6, wherein the specific control data include engine characteristics map values.

8. The method according to claim 1, further comprising the steps of:
   assuming a basic condition each time after a power supply to an automotive controller is one of started and restarted, the basic condition indicating that no optional power consuming components are present;
   activating an identification check in certain normal states, the certain normal states comprising idling; and
   once detected, regarding the components as identified and present until a next power fail.

9. The method according to claim 1, further comprising the step of:
   performing identification of the component as a function of a load signal gradient and a subsequent comparison with at least one of an upper threshold and a lower threshold while switching the optional power consuming component one of on and off.

10. A device for automatic detection of an equipment status of a component of an automobile, comprising:
    an automotive controller, the controller forming a signal as a function of an engine load; and
    a monitoring device for monitoring the signal, wherein the monitoring device detects the equipment status of a component if the component is activated and the signal is within a predetermined range.

11. A computer program product directly loadable into a memory of a digital computer, the computer program product including software sections for performing the steps of:
    activating a component; and
    monitoring an engine load of the automobile, whereby the component is detected if the engine load is between a predefined upper limit and a predefined lower limit, while the computer program product is running on the computer.

12. A method of automatic detection of an equipment status of a component of an automobile, comprising the steps of:
    activating a component; and
    monitering an engine load of the automobile, whereby the component is detected if the engine load is between a predefined upper limit and a predefined lower limit.

* * * * *

UNITED STATES PATENT AND TRADEMARK OFFICE
CERTIFICATE OF CORRECTION

PATENT NO.    : 6,470,694 B1
DATED         : October 29, 2002
INVENTOR(S)   : Reiner Buck et al.

It is certified that error appears in the above-identified patent and that said Letters Patent is hereby corrected as shown below:

<u>Column 1,</u>
Line 46, change "appropriate precontrol valued" to -- appropriate precontrol values --.

Signed and Sealed this

Second Day of September, 2003

JAMES E. ROGAN
*Director of the United States Patent and Trademark Office*